June 27, 1933.                W. M. HOWSER                1,915,670
                    ADJUSTABLE PILOT FOR SMALL HOLES
                          Filed Jan. 16, 1931
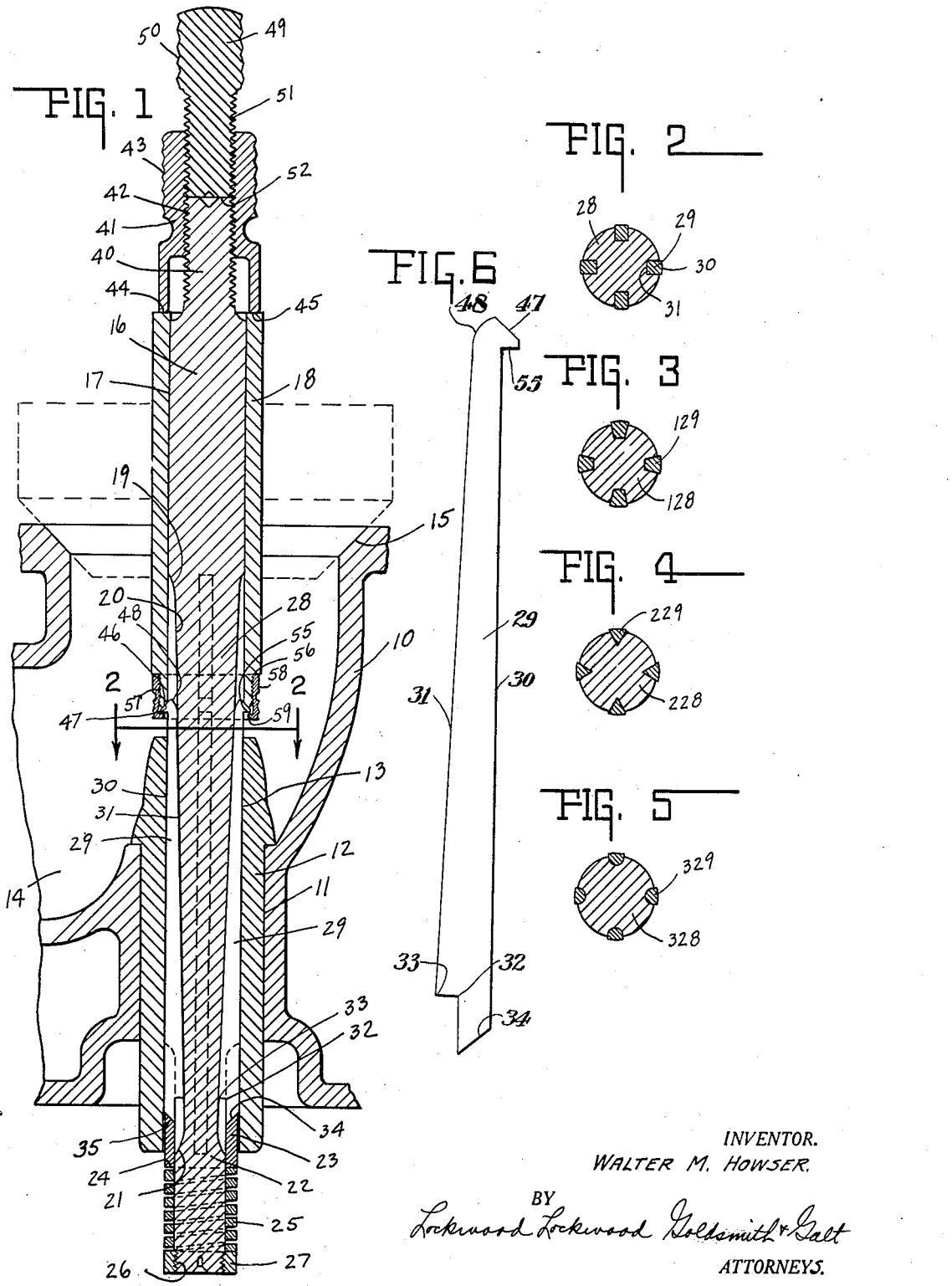
INVENTOR.
WALTER M. HOWSER.
BY
Lockwood Lockwood Goldsmith & Galt
ATTORNEYS.

Patented June 27, 1933

1,915,670

UNITED STATES PATENT OFFICE

WALTER M. HOWSER, OF INDIANAPOLIS, INDIANA

ADJUSTABLE PILOT FOR SMALL HOLES

Application filed January 16, 1931. Serial No. 509,120.

This invention relates to a pilot for a valve seat forming tool and is adapted for mounting in a valve guide.

The chief object of this invention is to provide a pilot of the aforesaid character which has the following characteristics. It is self-cleaning, provides perfect bearing alignment and is universal in that it can be adjusted and thereafter automatically adjusts itself to any desired micrometer differences and can be used where a stationary pilot would be used or where a rotatable pilot would be used.

The chief feature of the invention consists in the formation of the pilot, whereby the same not only accomplishes the aforesaid object, but is axially insertable into and readily removable from the valve guide through the valve seat forming opening and which, when inserted into the valve guide, may be adjusted for rotation so that the desired minimum clearance or so-called "running fit" is obtained between the pilot and the guide, thereby insuring substantial perfect bearing alignment, whereby the valve seat may be formed so that it will be exactly coaxial with the bore of the valve guide.

The full nature of the invention will be understood from the accompanying drawing and the following description and claims:

In the drawing, Fig. 1 is a central sectional view through a motor block, including the valve guide thereof and the pilot mounted therein and the valve seat forming tool diagrammatically indicated.

Fig. 2 is a transverse sectional view through the pilot and is taken on line 2—2 of Fig. 1 and in the direction of the arrows.

Fig. 3 is a similar view of a modified form of the invention.

Fig. 4 is a similar view of a still further modified form of the invention.

Fig. 5 is a similar view of another modified form of the invention.

Fig. 6 is an enlarged side elevation of one of the aligning and bearing strips.

In the drawing, 10 indicates the motor block having valve guide opening 11 therein, in which is mounted, by press fitting or the like, the valve guide 12 having the valve stem bore 13 therein. The valve stem guide projects upwardly into the passage 14 which is adapted to be controlled by a valve. The passage 14 terminates as at 15 in a conical surface forming a valve seat. In motor operation, this valve seat becomes scales, deformed, pitted, warped and in the event a new valve is provided for the burned, warped, pitted or otherwise deformed valve removed from the motor, it is essential that the valve seat 15 be perfectly formed so that imperfect valve action will not be obtained when the perfect valve is mounted in the old valve guide. To obtain this perfect seating of the valve, it is necessary that perfect bearing alignment be obtained when the pilot is mounted in the bore and in order to obtain such perfect alignment, it is essential that the pilot have just the so-called "running fit without any shake" which means a minimum clearance of less than one-tenth of one-thousandth of an inch. Any additional clearance will not secure a perfect fit, because the pilot will wabble in the valve guide even though that wabbling be so slight that the most careful mechanic could not visually check the same.

Use of the present invention, therefore, insures perfect revalving of the engine and corresponds to factory rebuilding and this is all obtained through the use of the simple tool hereinafter described in detail.

In the drawing, 16 indicates the pilot body and 17 the cylindrical portion thereof upon which is rotatably and slidably mounted a so-called stop sleeve 18. The body throughout the major portion of its length is provided with a plurality of preferably equally spaced grooves or channels 19, which have a predetermined taper or inclination 20, whereby the depth of said channel or groove progressively increases from the cylindrical portion 17 toward the other end. The grooves, however, in the present form, terminate as at 21 in the portion 22 which constitutes a reduced portion of the stem. The reduced portion 22 of the stem is substantially cylindrical and rotatably and slidably supports a pusher sleeve 23 which bears at one end 24 upon a coiled spring 25 that is coaxial with the portion 22. The end of the stem is threaded as at 26 and a nut 27 is mounted thereon and serves as a spring retainer. The nut 27 is no greater in diameter than sleeve 23 and the sleeve 23 is no greater in diameter than the central portion 28 of the stem, which portion 28 includes the channels upon its surface.

Mounted in each groove or channel is an aligning bearing member or strip. Herein each strip is indicated generally by the numeral 29 and each includes an outer face 30 and an inner face or edge 31, the same being inclined to the outer face 30 and having an inclination complementary to the inclination 20. It will be obvious, therefore, that at all of the strips, which are identical, are simultaneously moved along in the grooves, that the bearing members or strips will have their outer surfaces 30 positioned closer together or farther apart for smaller or larger diameters and when control nut 41 is rotated the pilot will just turn in the bore of the valve guide, a substantially perfect, non-shaking fit and alignment for the guide will be obtained.

Each strip has an inner laterally offset shoulder 32 disposed at either an acute or a right angle to the bottom 31 forming an edge 33 which rides in the bottom or root of the channel 20 and serves as a collector to keep the channel clear so that as the strips are moved downwardly, reference being had to Fig. 1, the strip will clean the groove from any débris therein and thus no débris will accumulate behind the strip and between the complementary, inclined surfaces or edges of the strip and groove.

The lower end of each strip includes an inclined portion 34 which is inclined outwardly and upwardly and engages a similarly inwardly and upwardly inclined portion 35 of the pusher sleeve 23. Herein said sleeve is shown including a conical surface 35 so that independent of any rotary movement of the sleeve 23, the strips will always be laterally aligned and one strip will not be positioned differently in its groove than any of the other strips. This exact or duplicate positioning is maintained, because of the inclined, complementary, engaging faces 35 and 34 which are self cleaning since any debris therebetween is forced into the chamber between sleeve 23 and stem 22.

Whenever the stop sleeve 18 is retracted toward the end opposite the spring mounting, said spring becomes operative and through the pusher sleeve forces the strips upwardly and which, through the inclination of the groove and the complementary inclination of the strip back wall or edge, forces the strips outwardly and farther apart and all of said strips are forced outwardly and farther apart to the same extent. This outward movement is continued until the pilot stem is tight. Then by turning the control nut 41, the pilot automatically releases itself to a turning fit and automatically ceases contracting the instant the pilot starts to turn in the opening. Thereupon, the stop sleeve is locked in that position.

The reduced threaded end 40 of the pilot stem 16 supports a control sleve or nut 41 having the internal threaded portion 42 and the knurled exposed finger engaging portion 43. The face 44 thereof is adapted to the upper edge or end face 45 of the sleeve and limits any further upward movement of the sleeve 18. The sleeve includes the inclined or conical face 46 which engages the inclined face 47 upon the upper ends of the strips 29. For a like reason, relative to the inclination of the complementary surfaces 34 and 35, the surfaces 47 and 46 are inclined and oppositely directed. The surface 46 is preferably angular and conical, so that if this sleeve be rotated, it will always engage, in lateral alignment, the upper ends of all the strips.

The width of the strip at each end is substantially the same, and as appears from Fig. 1, the bearings 47 and 34 are oppositely directed and contacted remote from the inner edges, thereby insuring the seating of the strip in its groove and without buckling outward.

The sleeve 18, as shown in Fig. 1, has a skirt formation in that it completely encloses the upper and unoccupied portions of the groove 20. Thus, debris does not and cannot collect in said grooves. In order to permit free, upward movement of the strips, the upper end adjacent the back wall thereof is inclined upwardly and outwardly as at 48. A locking bolt 49 having the exposed knurled portion 50 and the threaded body portion 51, may be threaded into the threaded portion 42 of the sleeve or nut 41, until it engages the end 52 of the pilot stem and thus the parts are all locked together without the use of any tools.

It will be observed that the greatest diameter is the outside diameter of sleeve 18 and that the outside diametre of sleeve 23 is less than the outside diameter of the grooved portion 28 of the stem and that no portion of the spring 25 or locking nut 27 projects beyond the same. This permits the axial insertion and removal of the pilot stem into the valve guide bore and when inserted the turning fit adjustment can be readily obtained and maintained by manipulating the sleeve 18.

The aforesaid constitutes one of the simplest forms of the invention.

To insure positive travel of the strips and make the same substantially independent of the spring 25, the upper end of each strip is shouldered as at 55, forming a hook. The lower end of the stop sleeve 18 is reduced as at 56 and threaded as at 57 and a cup type locking nut 58 is threaded thereon. The inwardly directed ledge portion 59 forms a retainer or catch that is engaged by the hook portions 55 upon the upper ends of the strips. With this construction, the body sleeve 18 after the pilot has been positioned in the valve guide can be moved upwardly and axially, and rotated, if desired, until the "running fit" specified is obtained. Thereafter, the sleeve 18 is locked by the nut 41 and this in turn is locked in a maintaining position by the bolt 49.

It will be noted, see Figs. 1 and 6, that the inclined conical face 46 is concentric with the inclined conical face 35 so that faces 47 and 34 of each strip are offset from each other. Also they slope oppositely of each other and are also offset from each other. This arrangement insures full seating of the back or inner edge of the strip 29 in the back or bottom of groove 31 throughout the length of the strip or without outward buckling of the strip which is of very small depth and width compared to its length.

In certain forms of the invention, a rectangular sectioned slot may not be desirable. It may me desired for quantity production formation to form the two opposite side walls of the groove, so that they are inclined or directed toward each other and the bottom or root of the groove. In Fig. 3 the strip 129 and the body 128 have a keystone or wedge association.

In Fig. 4, there is illustrated a similarly modified form in which 228 indicates the body having V-grooves in which are mounted the V or sectored sectioned strips 229. Each outer surface 30 of each strip is preferably arcuate, as illustrated.

In Fig. 5, the body 328 has arcuately outlined grooves which receive complementary formed strips 329. The same herein is shown partially cylindrical in cross-section.

Various other modifications which will readily suggest themselves to those skilled in the art to which this invention applies, are all considered to be within the broad scope of this invention, the same being defined by the depending claims.

The invention claimed is:—

1. A pilot for a seat forming tool, comprising a stem having gradually deepened grooves disposed longitudinally thereof, a strip slidable in each groove, each strip cut away on its under surface inwardly from that end disposed in the deeper portion of its groove, a collector shoulder terminating the inner end of said cut away portion, a sleeve encircling said stem and the deeper portions of said grooves and abutting the adjacent ends of said strips, said sleeve movable with said strips, and means for moving said strips.

2. A pilot for a seat forming tool, comprising a stem having gradually deepened grooves disposed longitudinally thereof, a strip slidable in each groove, each strip cut away on its undersurface inwardly from that end disposed in the deeper portion of its groove, a collector shoulder terminating the inner end of said cut-away portion and engaging the base of the groove, a sleeve encircling said stem and the deeper portions of said grooves and abutting the adjacent ends of said strips, the said cutaway portions and said sleeve constituting closed pockets, said sleeve movable with said strips, and means for moving said strips.

3. A pilot for a seat forming tool, comprising a stem having longitudinal grooves deepening gradually toward one end thereof, a substantially thin strip capable of flexing slidable in each groove, each strip increasing in depth from one end to the other corresponding to its groove, a head on the smaller end of each strip broader than the said smaller end and having a portion projecting beyond the circumference of said stem and an inclined face connecting the outer end of said portion with the extremity of said strip at the head, a substantial part of said inclined face disposed beyond the circumference of said stem, a sleeve slidable on said stem adapted to engage at one end with said inclined face beyond the circumference of said stem, whereby when the sleeve moves against said inclined face the said strip is caused to exert pressure throughout its medial portions with the bottom of the groove, and a connection between said sleeve and said strip.

In witness whereof, I have hereunto affixed my signature.

WALTER M. HOWSER.